(12) United States Patent
Beierl

(10) Patent No.: US 8,714,623 B2
(45) Date of Patent: May 6, 2014

(54) CONVERTIBLE VEHICLE

(75) Inventor: Dominik Beierl, Korntal-Muenchingen (DE)

(73) Assignee: Dr. Ing. H.C.F. Porsche Aktiengesellschaft, Stuttgart (DE)

( * ) Notice: Subject to any disclaimer, the term of this patent is extended or adjusted under 35 U.S.C. 154(b) by 147 days.

(21) Appl. No.: 13/191,809

(22) Filed: Jul. 27, 2011

(65) Prior Publication Data

US 2012/0025562 A1 Feb. 2, 2012

(30) Foreign Application Priority Data

Jul. 28, 2010 (DE) .......................... 10 2010 036 672

(51) Int. Cl.
*B60J 7/12* (2006.01)

(52) U.S. Cl.
USPC .................................................... 296/107.12

(58) Field of Classification Search
USPC ............ 296/100.08–100.12, 107.17, 18, 121, 296/100.14, 107.12
See application file for complete search history.

(56) References Cited

U.S. PATENT DOCUMENTS

| | | | |
|---|---|---|---|
| 5,096,251 A | 3/1992 | Pfertner et al. | |
| 5,816,644 A | 10/1998 | Rothe et al. | |
| 6,152,516 A * | 11/2000 | Williams | 296/98 |
| 6,331,029 B1 | 12/2001 | Schenk | |
| 7,021,696 B2 * | 4/2006 | Doncov et al. | 296/121 |
| 7,104,587 B2 * | 9/2006 | MacNee et al. | 296/121 |
| 7,226,110 B2 * | 6/2007 | Doncov et al. | 296/121 |
| 7,341,303 B2 * | 3/2008 | MacNee et al. | 296/121 |
| 7,455,347 B2 | 11/2008 | Heselhaus | |
| 2003/0098594 A1 * | 5/2003 | Hahn | 296/107.12 |

FOREIGN PATENT DOCUMENTS

| | | |
|---|---|---|
| DE | 295 10 118 U1 | 8/1995 |
| DE | 19911537 C1 | 9/2000 |
| DE | 10140433 A1 | 2/2003 |
| DE | 10345296 A1 | 5/2005 |
| DE | 102007021490 A1 | 11/2008 |
| EP | 0 429 777 A2 | 6/1991 |

* cited by examiner

*Primary Examiner* — Glenn Dayoan
*Assistant Examiner* — Pinel Romain
(74) *Attorney, Agent, or Firm* — RatnerPrestia

(57) ABSTRACT

A convertible vehicle has a convertible top which can be moved between a closed convertible top position and an opened convertible top position and which is extended in its closed convertible top position over a convertible top frame with a convertible top linkage. A storm linkage is coupled in an articulated fashion, by a supporting device for supporting the closed convertible top, between the convertible top linkage and a tensioning bar which is arranged at the rear. In order to improve the support of the storm linkage in the convertible vehicle, the supporting device has a locking connecting rod with a roller which interacts with the storm linkage.

7 Claims, 3 Drawing Sheets

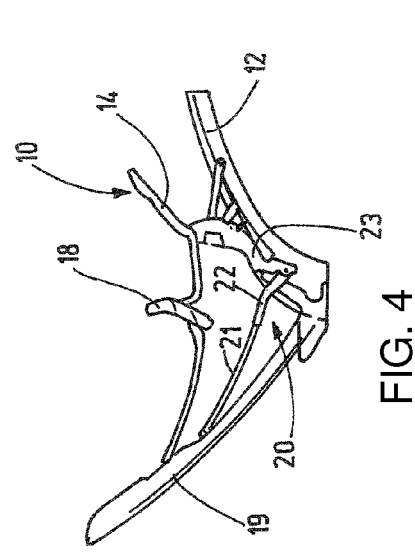
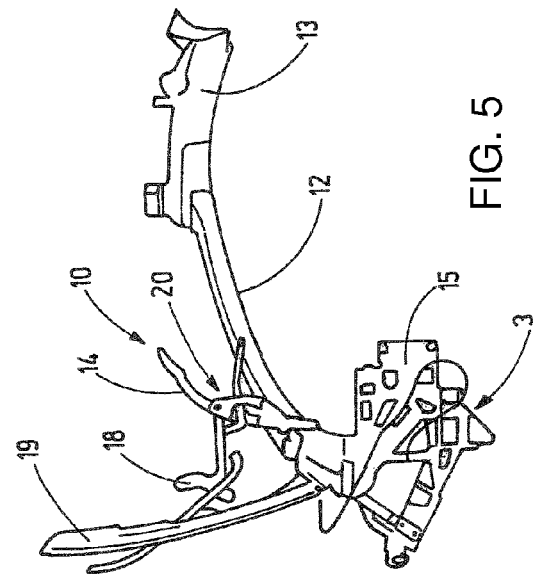
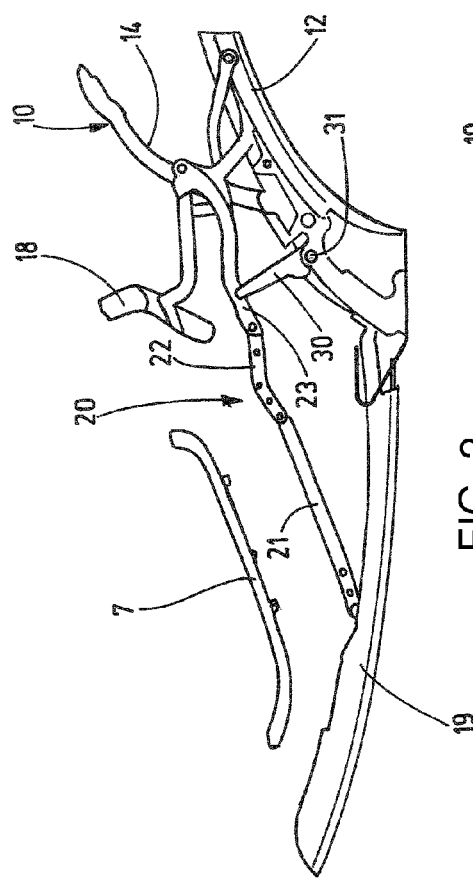
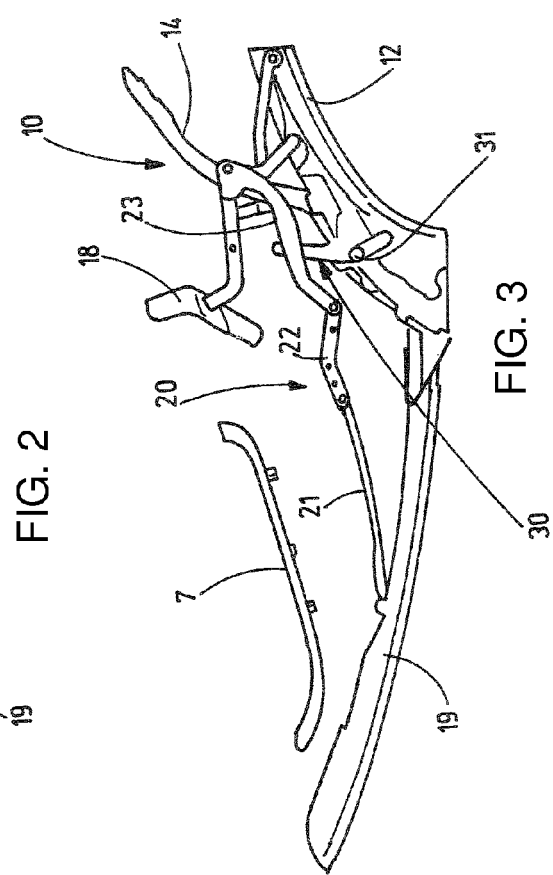

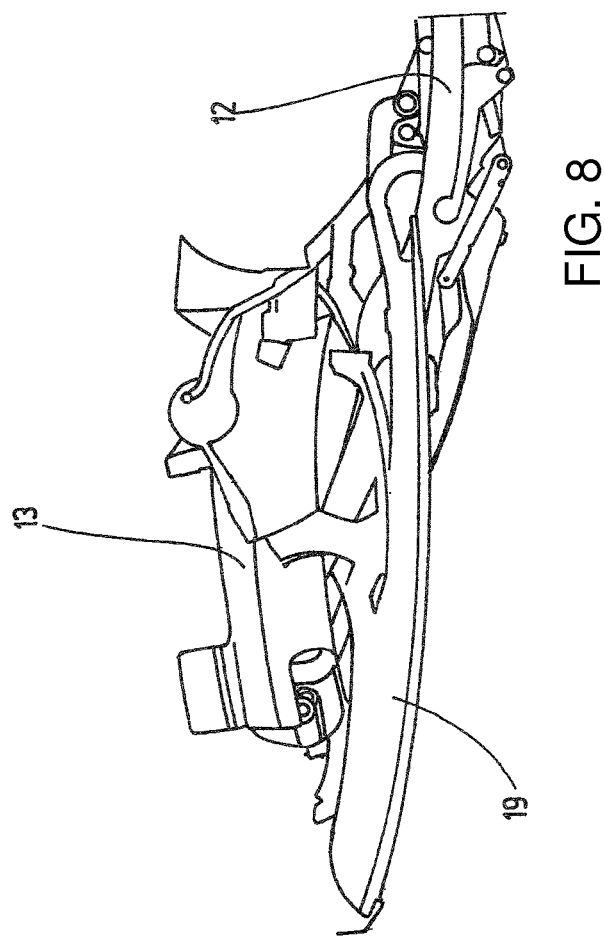
FIG. 8
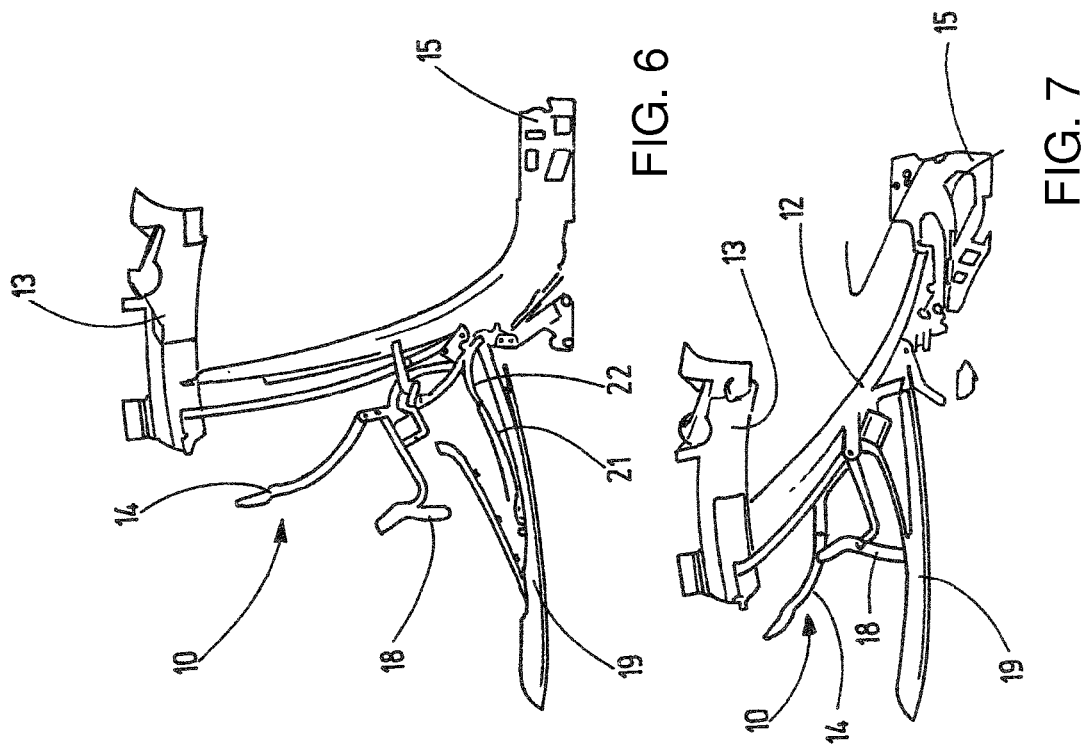
FIG. 6
FIG. 7

CONVERTIBLE VEHICLE

CROSS-REFERENCE TO RELATED APPLICATION

This application claims the priority, under 35 U.S.C. §119, of German application DE 10 2010 036 672.2, filed Jul. 28, 2010; the prior application is herewith incorporated by reference in its entirety.

BACKGROUND OF THE INVENTION

Field of the Invention

The invention relates to a convertible vehicle having a convertible top which can be moved between a closed convertible top position and an opened convertible top position and which is extended in its closed convertible top position over a convertible top frame with a convertible top linkage. A storm linkage is coupled in an articulated fashion, by a supporting device for supporting the closed convertible top, between the convertible top linkage and a tensioning bar which is arranged at the rear.

Published, European patent application EP 0 429 777 A2, corresponding to U.S. Pat. No. 5,096,251, discloses a folding top for a convertible vehicle having a tensioning bar which is arranged at the rear and which is operatively connected to a convertible top linkage via front and rear storm rods. A support device is provided between the tensioning bar lying underneath and a connecting region of the two storm rods lying above it, which support device is composed of the forcibly controlled supporting bar which is rotatably mounted on the tensioning bar. German utility model DE 295 10 118 U1 discloses a folding top for a convertible vehicle having a storm linkage which contains a plurality of storm rods and storm linkage parts, one of which is coupled to a drive element which contains a hydraulic drive cylinder.

SUMMARY OF THE INVENTION

It is accordingly an object of the invention to provide a convertible vehicle which overcomes the above-mentioned disadvantages of the prior art devices of this general type, which improves the support of the storm linkage in the convertible vehicle.

With the foregoing and other objects in view there is provided, in accordance with the invention a convertible vehicle. The convertible vehicle contains a convertible top frame having a convertible top linkage, a convertible top being moved between a closed convertible top position and an opened convertible top position and being extended in the closed convertible top position over the convertible top frame with the convertible top linkage, a tensioning bar disposed at a rear, and a supporting device having a locking connecting rod with a roller. A storm linkage is coupled in an articulated fashion, by the supporting device for supporting the convertible top in the closed convertible top position, between the convertible top linkage and the tensioning bar. The roller of the supporting device interacts with the storm linkage.

The object is achieved in a convertible vehicle having a convertible top which can be moved between a closed convertible top position and an opened convertible top position and which is extended in its closed convertible top position over a convertible top frame with a convertible top linkage. A storm linkage is coupled in an articulated fashion, by a supporting device for supporting the closed convertible top, between the convertible top linkage and a tensioning bar which is arranged at the rear. The supporting device contains a locking connecting rod with a roller which interacts with the storm linkage. As a result of the roller, the forces necessary to activate and deactivate the support device can be reduced. This considerably simplifies the operation of the convertible top, which can be carried out in a manual or automatic fashion.

One preferred exemplary embodiment of the convertible vehicle is characterized in that the storm linkage contains three storm rods which are coupled to one another in series. The storm rods are coupled to one another or coupled to one another in an articulated fashion in such a way that the convertible top is extended in a stable fashion as long as the support device is actuated. If the support device is deactivated automatically or manually, the storm rods can be folded up with the convertible top linkage and stowed away.

A further preferred exemplary embodiment of the convertible vehicle is characterized in that the storm linkage is coupled in an articulated fashion to the tensioning bar by a first storm rod, and to the convertible top linkage by a third storm rod. A second storm rod connects the first storm rod to the third storm rod in a rotatably articulated fashion.

A further preferred exemplary embodiment of the convertible vehicle is characterized in that the third storm rod has a guide for the roller which is provided in a rotatable fashion on the locking connecting rod. The guide contains a guide track on which the roller can roll in a defined fashion.

A further preferred exemplary embodiment of the convertible vehicle is characterized in that in a locked position the locking connecting rod presses with the roller against the guide on the third storm rod in such a way that the storm linkage is held in an extended position. As a result sufficient tension is maintained between the tensioning bar and the convertible top frame when the convertible top is closed.

A further preferred exemplary embodiment of the convertible vehicle is characterized in that the locking connecting rod is mounted at its end facing away from the roller so as to be pivotable between the locked position and a released position in which the tensioning bar can be moved upward. In the released position, the roller is freed from the guide on the third storm rod, with the result that the storm linkage is no longer held in its extended position. In the released position of the locking connecting rod, the individual storm rods can move freely with respect to one another about corresponding centers of rotation.

A further preferred exemplary embodiment of the convertible vehicle is characterized in that the tensioning bar is prestressed in the upward direction by at least one spring. As a result of the spring prestressing force, the tensioning bar is moved upward when the locking connecting rod assumes its released position.

A further preferred exemplary embodiment of the convertible vehicle is characterized in that the three storm rods are coupled to one another and to the convertible top frame in such a way that the storm linkage folds together when the tensioning bar moves upward. As soon as the locking connecting rod has assumed its released position, the tensioning bar can be moved further upward in a manual fashion, with the result that a convertible top box lid arranged underneath the latter can be opened in order to stow away the convertible top with the convertible top frame and the convertible top linkage in a convertible top box.

Other features which are considered as characteristic for the invention are set forth in the appended claims.

Although the invention is illustrated and described herein as embodied in a convertible vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 2 to 8 are diagrammatic, perspective views of the convertible vehicle from FIG. 1 when the convertible top is folded up and stowed.

DETAILED DESCRIPTION OF THE INVENTION

Figure 1:
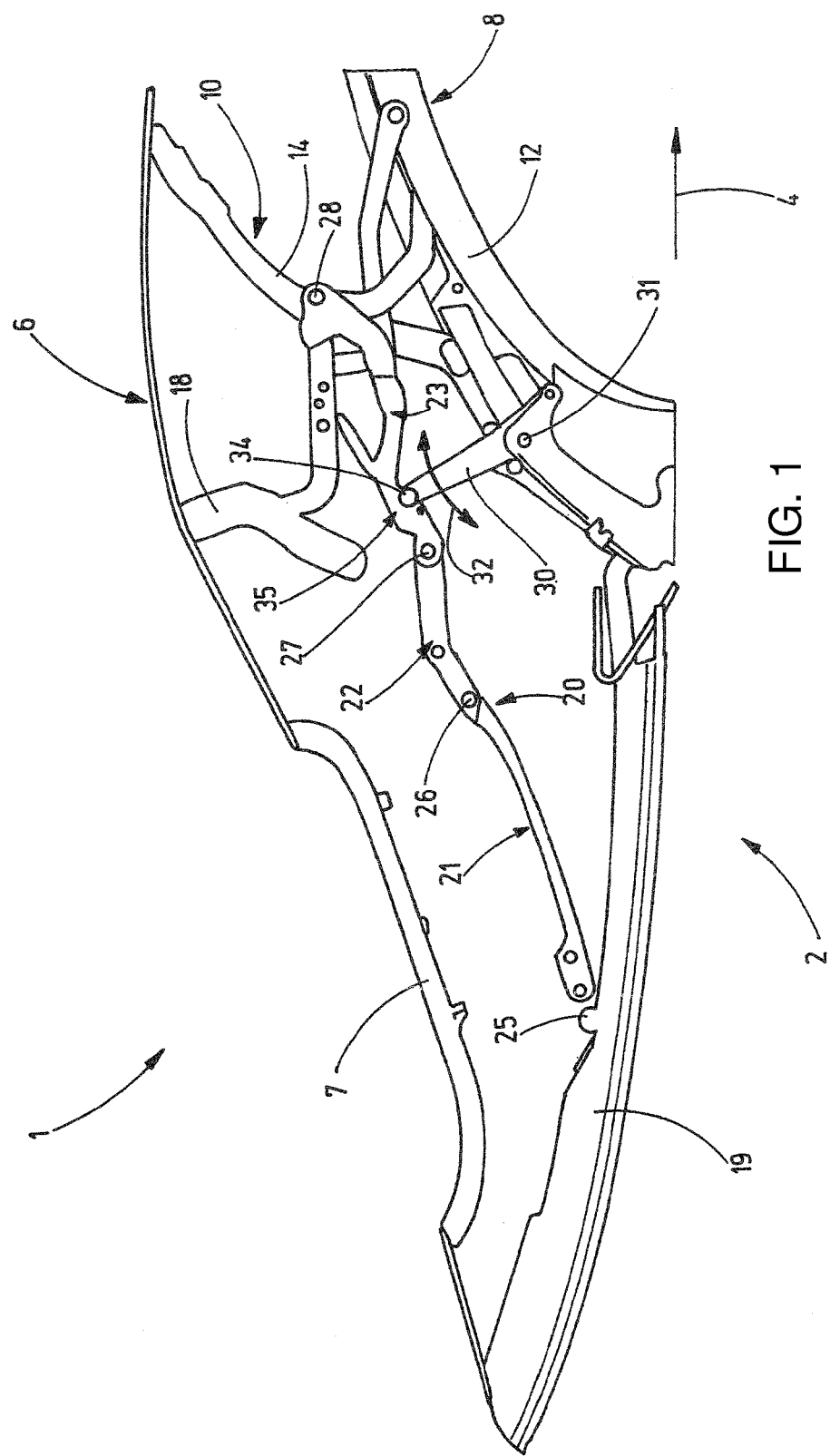
FIG. 1 is a simplified illustration of a rear part of a convertible vehicle with a closed convertible top according to the invention.

FIGS. 1 to 8 illustrate a convertible vehicle 1 with a rear part 2 in various details and states. The convertible vehicle 1 has a supporting structure 3, which is also referred to as a vehicle body. A direction of travel, in particular a forward direction of travel, or longitudinal direction of the vehicle, which is also referred to as the x axis, is indicated in FIG. 1 by an arrow 4. The direction of travel 4 also applies in FIGS. 2 to 8.

FIG. 1 indicates the convertible top 6 of the convertible vehicle 1 in its closed convertible top position. The convertible top 6 contains a rear window 7, and in the illustrated closed position it is extended over a convertible top frame 8 which contains a convertible top linkage 10 and roof frame parts 12, 13. A main connecting rod 14 of the convertible top linkage 10 is, as can be seen for example in FIG. 5, mounted on a convertible top bearing 15 so as to be pivotable about a rotational axis.

The convertible top linkage 10 also contains a corner bow 18 which is coupled in an articulated fashion to the convertible top linkage 10. In the closed position of the convertible top 6, a tensioning bar 19 rests on a convertible top box lid (not illustrated) which closes a convertible top box in which the opened convertible top is stowed with folded-up convertible top frame 8 or convertible top linkage 10.

So that the tensioning bar 19 can be restrained in a stable fashion on the convertible top box lid when the convertible top 6 is closed, a storm linkage 20 is provided which is connected in an articulated fashion between the tensioning bar 19 and the convertible top linkage 10. In FIGS. 1 and 2, the storm linkage 20 is in an extended position, with the result that a sufficient convertible top tension is maintained.

The storm linkage 20 contains a first storm rod 21 which is coupled in an articulated fashion by one end to the tensioning bar 19 via a joint 25. One end of a second storm rod 22 is coupled in an articulated fashion to the other end of the first storm rod 21 in a further joint 26. The other end of the second storm rod 22 is coupled in an articulated fashion to one end of a third storm rod 23 in a further joint 27. The other end of the third storm rod 23 is coupled in an articulated fashion to the main connecting rod 14 of the convertible top linkage 10 in a further joint 28.

The storm linkage 20 is, as can be seen in FIGS. 1 and 2, held in its extended position by the locking connecting rod 30. The locking connecting rod 30 is, as is indicated by a double arrow 32, coupled in an articulated fashion, at its end which is the lower one in FIGS. 1 and 2, to the convertible top frame 10 or the roof frame part 12 so as to be pivotable about a rotational axis 31.

A roller 34 is rotatably mounted on the end of the locking connecting rod 30 which faces away from the roof frame part 12 in FIGS. 1 and 2. In the closed convertible top state, the roller 34 is guided in a guide track 35 which is provided on the third storm rod 23 of the storm linkage 20.

The guide track 35 is configured in such a way that in the closed convertible top state the roller 34 is held in the position illustrated in FIGS. 1 and 2 in a stable manner. By pivoting the locking connecting rod 30 in one of the two pivoting directions indicated by the double arrow 32, the roller 34 can be released manually or automatically from the guide track 35.

In FIG. 3, the locking connecting rod 30 is pivoted with respect to FIG. 2 in the clockwise direction about the rotational axis 31, with the result that at the end of the locking connecting rod 30 the roller 34 is freed from being guided with the guide track 35. The locking connecting rod 30 can be moved manually or automatically, for example electrically, out of its locked position illustrated in FIGS. 1 and 2 into its released position illustrated in FIG. 3.

By means of a spring (not illustrated) with corresponding spring prestressing force, the tensioning bar 19 is moved slightly upward when the locking connecting rod 30 is unlocked. Afterwards, the tensioning bar 19 can be raised manually, as can be seen in FIGS. 4 and 5, wherein the convertible top frame 8 is partially folded up with the convertible top linkage 10. Afterwards, the convertible top box lid can be opened manually or automatically.

As soon as the convertible top box lid is opened, the tensioning bar 19 can be moved downward again, as can be seen in FIGS. 6 and 7, in order to fold up the convertible top with the convertible top frame 8 and the convertible top linkage 10 and stow it in the convertible top box. FIG. 8 illustrates the convertible top frame 8 with the convertible top linkage 10 and the storm linkage 20 in its opened position, which is also referred to as the stowage position.

The invention claimed is:

1. A convertible vehicle, comprising: a convertible top frame having a convertible top linkage; a convertible top being moved between a closed convertible top position and an opened convertible top position and being extended in the closed convertible top position over said convertible top frame with said convertible top linkage; a tensioning bar disposed at a rear; a supporting device having a locking connecting rod with a roller; and a storm linkage coupled in an articulated fashion, by means of said supporting device for supporting said convertible top in the closed convertible top position, between said convertible top linkage and said tensioning bar, said roller of said supporting device interacting with said storm linkage, and wherein said storm linkage has three storm rods coupled to one another in series, said three storm rods include a first storm rod, a second storm rod and a third storm rod.

2. The convertible vehicle according to claim 1, wherein said storm linkage is coupled in an articulated fashion to said tensioning bar by means of said first storm rod, and to said convertible top linkage by means of said third storm rod.

3. The convertible vehicle according to claim 2, wherein said third storm rod has a guide for said roller.

4. The convertible vehicle according to claim 3, wherein in a locked position said locking connecting rod presses with said roller against said guide on said third storm rod in such a way that said storm linkage is held in an extended position.

5. The convertible vehicle according to claim 4, wherein said locking connecting rod is mounted at an end facing away from said roller so as to be pivotable between a locked position and a released position in which said tensioning bar can be moved upward.

6. The convertible vehicle according to claim 5, further comprising at least one spring, said tensioning bar is pre-stressed in a upward direction by said at least one spring.

7. The convertible vehicle according to claim 1, wherein said three storm rods are coupled to one another and to said convertible top frame in such a way that said storm linkage folds together when said tensioning bar moves upward.

* * * * *

UNITED STATES PATENT AND TRADEMARK OFFICE
CERTIFICATE OF CORRECTION

| | | |
|---|---|---|
| PATENT NO. | : 8,714,623 B2 | Page 1 of 1 |
| APPLICATION NO. | : 13/191809 | |
| DATED | : May 6, 2014 | |
| INVENTOR(S) | : Dominik Beierl | |

It is certified that error appears in the above-identified patent and that said Letters Patent is hereby corrected as shown below:

On the Title Page, Item (73), Assignee, "Dr. Ing. H.C. F. Porsche Aktiengesellschaft" should read -- Dr. Ing. h.c. F. Porsche Aktiengesellschaft --.

Signed and Sealed this
Fifth Day of August, 2014

Michelle K. Lee
*Deputy Director of the United States Patent and Trademark Office*